United States Patent

[11] 3,593,573

| [72] | Inventor | Richard E. Ely<br>Huntsville, Ala. |
|---|---|---|
| [21] | Appl. No. | 809,854 |
| [22] | Filed | Mar. 24, 1969 |
| [45] | Patented | July 20, 1971 |
| [73] | Assignee | The United States of America as represented by the Secretary of the Army |

[54] FLUID PRESSURE END LOADING TEST APPARATUS
5 Claims, 1 Drawing Fig.

[52] U.S. Cl. ................................................ 73/94,
73/49.8, 73/103
[51] Int. Cl. .............................................. G01n 3/10
[50] Field of Search .......................... 73/94, 103,
49.8, 49.6

[56] References Cited
UNITED STATES PATENTS

| 2,671,339 | 3/1954 | Krause et al. .................. | 73/49.6 |
| 3,388,588 | 6/1968 | Vincenot ....................... | 73/49.8 |

*Primary Examiner*—Jerry W. Myracle
*Attorneys*—Harry M. Saragovitz, Edward J. Kelly, Herbert Berl and Charles R. Carter ABSTRACT: A fluid pressure end loading apparatus for axially testing cylinder specimens under compression loads. The apparatus includes a top plate having a fluid housing mounted thereon, a bottom plate also having a fluid housing mounted thereon and guide pins for guiding the movement of the top plate. The specimen to be tested is mounted between the two fluid housings and the load is applied until the specimen fractures.

PATENTED JUL 20 1971 3,593,573
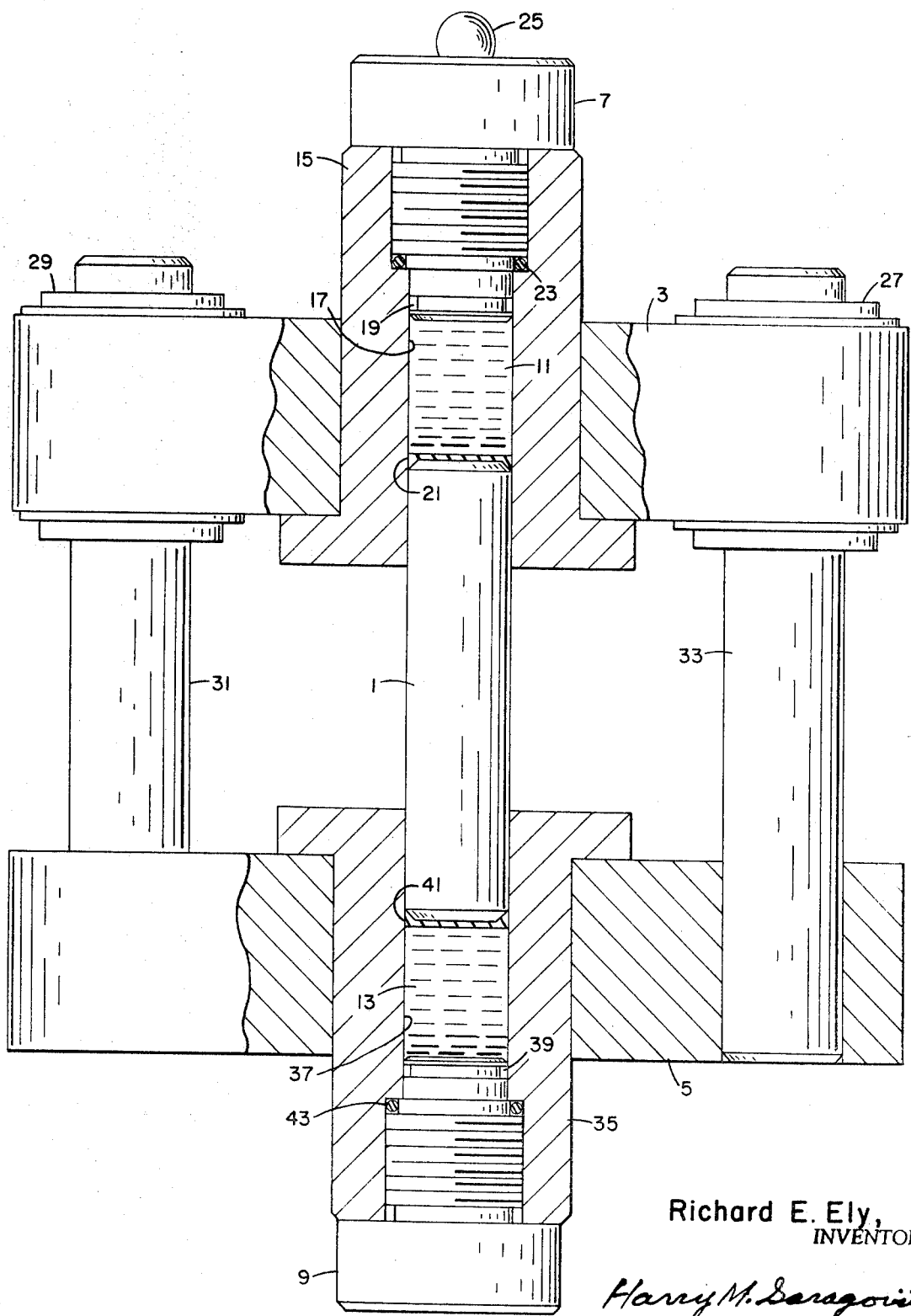
Richard E. Ely,
INVENTOR

3,593,573

FLUID PRESSURE END LOADING TEST APPARATUS

BACKGROUND OF THE INVENTION

This invention relates to the field of specimen testing under compression loads. When cylinders of brittle or other materials are compressed between metal plates, the ultimate compressive load is usually less than the true load because of premature failure. This failure is caused by nonuniform stress fields on the specimen end surfaces caused in metal to metal transmission of the load by unevenness of the surfaces in contact.

SUMMARY OF THE INVENTION

The present invention has provided a solution to this problem by utilizing fluid as a medium for transmitting an axial compression load to the specimen's end surfaces. Fluid end loading applies uniform unit stress to the specimen since the fluid and seals conform exactly to the topography of the surfaces of the specimen.

This invention may be better understood from the following detailed description taken in conjunction with the accompanying drawing.

BRIEF DESCRIPTION OF THE DRAWING

The single FIGURE shown in the drawing is a sectional view of the apparatus.

DESCRIPTION OF THE PREFERRED EMBODIMENT

Reference numeral 1 indicates a columnar specimen to be tested and is located between a top plate 3 and a lower plate 5. As a load is applied to the testing apparatus through an upper plug 7 and a lower plug 9, the actual compression load is transmitted through fluid mediums 11 and 13. Plates 3 and 5 and resilient seals 21 and 41 apply uniform unit pressure to the specimen's end surfaces. Plates 3 and 5 have housings 15 and 35 secured therein and the housings have openings 17 and 37 that extend the length thereof. Plugs 7 and 9 engage the end of housings 15 and 35 respectively to close off the openings and are provided with piston-type ends 19 and 39 extending into said housings. Seals 21 and 41 engage the fluid medium to prevent fluid leakage and seat the specimen being tested. Seals 21 and 41 are resilient to conform exactly to the surfaces of specimen. O-rings 23 and 43 are placed between housings 15 and 35 and plugs 7 and 9 to prevent fluid leakage. A ball joint 25 is located on upper plug 7 to act as the load-applying point. The top plate has two bearings 27, 29 extending therethrough to receive guide pins 31, 33. This top plate is lifted up from the guide pins to place a new specimen in the apparatus for testing.

Lower plate 5 has fixed guide pins 31 and 33 for guiding parallel movement of the top plate.

The operation of the fluid pressure testing apparatus is as follows: The top plate is lifted off from the guide pins, a specimen is placed on the lower seal 41 and the plate is put back on the guide pins so that seal 21 engages the upper end of the specimen. A compression load is applied, in a conventional manner, to the plugs 7, 9 which causes relative movement of plate 3 with respect to plate 5 applying the load through the fluids mediums, to produce uniform unit pressure to the specimen. Conventional mechanism is used for recording when breakage occurs.

I claim:
1. An apparatus for applying a compressive test load on a columnar specimen's end surfaces comprising; a pair of opposed load applying plates; a housing secured to each of said plates, each of said housings provided with a bore for receiving one end of the specimen; seals means disposed between the specimen ends and said bores; and, a fluid medium within said housings for applying the load to the ends of the specimen to be tested.
2. An apparatus as defined in claim 1 wherein said sealing means being resilient to transmit uniform unit loading to the ends of the specimen.
3. An apparatus as defined in claim 2 wherein one end of each of said housings is provided with a plug disposed in spaced relation with each of said seal means for retention of said fluid medium therebetween.
4. An apparatus as defined in claim 3 wherein said plugs include piston like surfaces extending into said housing, whereby said fluid medium is compressed between said piston-like surfaces and said seal for establishing a substantially frictionless engagement of said load applying plates and the specimen.
5. An apparatus as defined in claim 4 wherein one of said plates has guide pins attached thereto and the other of said plates is provided with bearings for slidable cooperation with said guide pins.